United States Patent [19]

McNally

[11] Patent Number: 4,712,106

[45] Date of Patent: Dec. 8, 1987

[54] PHASE ANALOG ENCODING SYSTEM WITH COMPENSATION

[75] Inventor: Paul F. McNally, Gibsonia, Pa.

[73] Assignee: International Cybernetics Corporation, Pittsburgh, Pa.

[21] Appl. No.: 933,301

[22] Filed: Nov. 20, 1986

Related U.S. Application Data

[63] Continuation of Ser. No. 827,475, Feb. 5, 1986, abandoned, which is a continuation of Ser. No. 560,658, Dec. 12, 1983, abandoned.

[51] Int. Cl.[4] ...................... G08C 19/06; G08C 15/06; G01C 25/00

[52] U.S. Cl. .......................... 340/870.32; 340/870.04; 340/347 SY; 340/870.34; 364/559; 364/571; 318/661

[58] Field of Search ...................... 340/870.32, 870.34, 340/347 SY, 870.04; 364/559, 571, 815; 318/661, 632

[56] References Cited

U.S. PATENT DOCUMENTS

| | | | |
|---|---|---|---|
| 3,537,099 | 10/1970 | Johansson | 340/347 SY |
| 3,612,977 | 10/1971 | Perrett | 318/661 |
| 3,648,042 | 3/1972 | Perrett | 318/661 |
| 3,803,567 | 4/1974 | Pezzlo | 340/870.34 |
| 4,268,786 | 5/1981 | Rohrle | 340/347 SY |
| 4,472,669 | 9/1984 | Denham | 318/661 |
| 4,486,845 | 12/1984 | Duckworth | 364/559 |
| 4,594,540 | 6/1986 | Currie et al. | 340/347 SY |
| 4,618,940 | 10/1986 | Schmitt | 364/571 |

*Primary Examiner*—Ulysses Weldon
*Assistant Examiner*—Ralph E. Smith
*Attorney, Agent, or Firm*—Reed Smith Shaw & McClay

[57] ABSTRACT

A phase analog encoding system with compensation for the phase shift error inherent in a resolver position transducer. The inherent phase shift error in a resolver position transducer is compensated independent of a resolver position in a time multiplexed fashion by periodically applying a known reference signal to the resolver and measuring the electrical phase shift across only the resolver. The newly measured value of the inherent electrical phase shift is compared with the last measured value of the inherent electrical phase shift and any deviation is calculated. This deviation is used to determine the appropriate compensation value for the inherent electrical phase shift. The compensation value is subtracted from the resolver phase shift during normal operation resulting in an output signal which is independent of the inherent electrical phase shift error in the resolver position transducer.

19 Claims, 8 Drawing Figures

RESOLVER POSITION IN BINARY

| In Degrees | | Switch Closed |
|---|---|---|
| 360–315 | 111 | 98 |
| 315–270 | 110 | 97 |
| 270–225 | 101 | 97 |
| 225–180 | 100 | 99 |
| 180–135 | 011 | 99 |
| 135–90 | 010 | 95 |
| 90–45 | 001 | 95 |
| 45–0 | 000 | 98 |

PHASE ANALOG ENCODING SYSTEM WITH COMPENSATION

CROSS REFERENCE TO RELATED APPLICATION

This is a continuation of co-pending application Ser. No. 827,475 filed on Feb. 5, 1986, now abandoned, which is a continuation of Ser. No. 560,658, now abandoned, filed on Dec. 12, 1983.

This application is related to copending U.S. patent application Ser. No. 523,061 filed Aug. 15, 1983, now U.S. Pat. No. 4,577,271 entitled "Sampled Data Servo Control System with Deadband Compensation."

BACKGROUND OF THE INVENTION

1. Field of the Invention

This invention relates to a phase analog encoding system with compensation, used in connection with a resolver position transducer and utilized in servo control or monitoring applications.

A resolver position transducer is a device which monitors the position of a rotatable shaft or a linearly displaceable member by measuring the angular displacement of the shaft or the linear displacement of the member with respect to a fixed reference point. The resolver, when excited with the proper electrical input will output an electrical signal whose phase is related to the position of the shaft or member. Thus the position of the shaft or member is encoded in an electrical signal in an analog manner. By putting the electrical signal from the resolver position transducer through more encoding circuitry, an electrical signal can be obtained which represents the position of the shaft or member.

If one knows the position of the shaft or member, one can determine if a machine connected to the shaft or member is operating properly. Thus one is able to monitor the performance of a machine by measuring the angular displacement of a rotatable shaft or the linear displacement of a linearly displaceable member with a resolver position transducer.

Additionally, if one knows the position of a machine's shaft or member, one is able to use that information in a feedback network to control the operation of the machine in order to obtain any desired performance. Used in this manner, the resolver position transducer is performing a servo-control function.

2. Description of the Prior Art

The phase shift errors inherent in a resolver position transducer are of particular importance in applications where the resolver is part of a phase analog encoding system. The phase analog encoding technique utilized in such systems involves applying reference signals to the resolver position transducer in the form of two sinusoidal signals displaced in time by 90 electrical degrees such as:

$$VR1 = K_1 SIN\omega t \tag{1}$$

$$VR2 = K_1 COS\omega t \tag{2}$$

where VR1 is the voltage across the equivalent of a stator sine winding, VR2 is the voltage across the equivalent of a stator cosine winding and $K_1$ is a constant. Feedback from the resolver is taken by measuring the voltage across the equivalent of a resolver rotor winding, VFB. If VR1 and VR2 are applied to the equivalent stator sine and cosine windings, the equivalent resolver rotor winding has a voltage of the form:

$$VFB = K_2 SIN(\omega t + \phi + \alpha) \tag{3}$$

where $\phi$ is the mechanical displacement of a rotatable shaft or a linearly displaceable member, $\alpha$ is the inherent electrical phase shift across the windings of the resolver position transducer, and $K_2$ is a constant. If the resolver position transducer is monitoring a rotatable shaft, the mechanical displacement $\phi$ is an angular displacement. If the resolver position transducer is monitoring a linearly displaceable member, the mechanical displacement $\phi$ is a linear displacement.

The typical phase analog encoder operates by measuring the relative phase difference (i.e., phase shift) between one of the reference signals (1) or (2) and the feedback signal (3). This measured phase shift is equal to the sum of the mechanical displacement $\phi$ and an offset value which is the electrical phase shift across the equivalent stator and rotor windings of the resolver $\phi$.

The above encoding technique for measuring the mechanical displacement $\phi$ will be accurate as long as $\alpha$ remains constant. Usually $\alpha$ does not vary by more than one or two degress. As a result, the overall phase analog encoding system utilizing this technique is low cost, easy to apply and very effective for applications where an accuracy of one or two degrees is acceptable.

For many applications, however, the change in $\alpha$ with respect to: temperature; variations in input frequency; manufacturing tolerances and other mechanical constraints such as shaft loading; can be quite large, requiring some form of compensation. Typically, the most severe errors are introduced by variations in temperature. As a result, some form of compensation is necessary where the resolver will be operating in an environment with wide variations in the ambient temperature. Compensation is also necessary where the ambient temperature is constant but the resolver is attached to a device such as a motor which varies in temperature depending on how long the device has been operating.

There are two common forms of compensation for variations in temperature. One form involves mounting a temperature sensor in a network to compensate for the inherent electrical phase shift. The second form involves the use of an additional winding in the resolver position transducer and a separate encoding circuit which is used to monitor the electrical phase shift across the additional winding so that a compensating signal can be generated which is then used to correct the primary encoding circuitry of the resolver position transducer.

The disadvantage of both of the common forms of temperature compensation is that they involve additional components and more complex circuitry. This increases the total cost of the system and increase the possibility of component failure and system break down.

SUMMARY OF THE INVENTION

The present invention overcomes disadvantages and objections associated with the prior art compensation for the electrical phase shift across the windings of a resolver position transducer. The disclosed invention is for an encoding technique wherein the inherent electrical phase shift across the windings of a resolver position transducer (windings which are also part of the primary encoding circuit for determining the mechanical displacement of the position transducer) is measured in a time multiplexed fashion to correct for deviations due to all sources, including variations in temperature. It is to be understood that this invention can be applied to any sinusoidal position transducer. Where the term resolver transducer is used, it is intended to include: synchro, induction potentiometer resolver transmitter, control transfer transformer, differential control transformer and any other sinusoidal position transducer.

It is to be understood that this invention can be used in connection with a rotary resolver position transducer or a linear resolver position transducer. In a rotary resolver, the mechanical displacement is an angular displacement and is equal to the rotor angle. In a linear resolver, the mechanical displacement is linear. In a rotary resolver, there are at least two stationary windings called the stator windings and at least one moveable winding called the rotor winding. A linear resolver has at least two windings which are the electrical equivalents of the stator windings, and at least one winding which is the electrical equivalent of the rotor winding.

The invention utilizes a resolver position transducer in a phase analog encoding system wherein the total phase shift of the resolver transducer is determined by measuring the time interval between the zero crossing of the resolver since reference and the zero crossing of the resolver feedback taken from the equivalent of a rotor winding of the resolver position transducer. The measured time interval between the zero crossings T is proportional to the sum of the mechanical displacement $\phi$ and the electrical phase shift across the windings of the resolver transducer $\alpha$:

$$T = K_3(\phi + \alpha) \tag{4}$$

where $K_3$ is the proportionality constant.

Under normal operation (measurement cycle) the two stator windings of the resolver transducer are driven by highly accurate sinusoidal signals displaced in time by 90 electrical degrees. If the stator windings are excited by the above signals, the resolver rotor winding provides a phase analog feedback signal of the form indicated in equation (3). The time interval between the zero crossings of two waveforms which have the same form as equations (1) and (3) is proportional to $(\phi+\alpha)$. This time interval can be used by a calculating means such as a computer or a microprocessor to determine $(\phi+\alpha)$, $\phi$, and many other useful variables by executing predetermined numerical manipulations.

Periodically, at times selected by a calculating means and implemented by a reference switch in the resolver transducer encoding system, the resolver transducer is operated in a compensation mode. During the compensation mode, the resolver reference voltages (the voltages applied to the stator windings) are electronically switched and applied to the appropriate resolver stator windings. The appropriate windings are determined by the resolver encoding electronics to insure a large signal on the rotor windings. Depending upon the mechanical displacement $\phi$, either a resolver reference signal of $K_1 SIN\omega t$ or $-K_1 SIN\omega t$ is applied to one or the other of the resolver stator windings. This ensures that there will be the maximum possible output on the resolver rotor windings by applying a resolver reference voltage of the proper sign to the stator winding which has the most magnetic coupling for a given mechanical displacement $\phi$. For instance, in a rotary resolver position transducer where the mechanical displacement $\phi$ is an angular displacement represented by the mechanical rotor angle:

(a) If the mechanical displacement, $\phi$, is 0°, $\phi$45° or 315°, $\phi$360°, then $K_1 SIN\omega t$ is applied to the stator cosine winding;

(b) If the mechanical displacement, $\phi$, is 45°, $\phi$135°, then $K_1 SIN\omega t$ is applied to the stator sine winding;

(c) If the mechanical displacement, $\phi$, is 135°, $\phi$225°, then $-K_1 SIN\omega t$ is applied to the stator cosine winding;

(d) If the mechanical displacement, $\phi$, is 225°, $\phi$315°, then $-K_1 SIN\omega t$ is applied to the stator sine winding.

When the resolver reference voltages are applied during the compensation cycle as indicated above, the resolver transducer behaves electrically like a transformer with the excited stator winding acting like a primary winding and the rotor winding acting like a secondary winding. As such, the voltage on the secondary winding will only differ in phase from the voltage on the primary winding by an amount equal to the inherent electrical phase shift across the resolver windings. Thus, when the resolver encoder measures the time interval between the zero crossing of the resolver sine reference and the zero crossing of the resolver feedback signal, the resulting time interval T is proportional to the inherent electrical phase shift across the windings of the resolver transducer $\alpha$:

$$T = K_4(\alpha) \tag{5}$$

where $K_4$ is the proportionality constant.

The encoded value of $\alpha$ is then utilized by the calculating means to correct for any changes in the inherent electrical phase shift with respect to previous measurements. Once a proper value for the inherent electrical phase shift across the resolver windings $\alpha$ is determined, the calculating means can determine the exact mechanical displacement $\phi$ by subtracting the value of $\alpha$ from the measured quantity obtained during the normal measurement cycle, $(\phi+\alpha)$.

The duty cycle between the normal measurement cycle (measurement of $\phi+\alpha$) and the compensation cycle (measurement of $\alpha$ only) is determined by the calculating means and can be either a strict function of time and/or a function of other variables as deemed appropriate to the application of the resolver encoding system.

The phase analog encoding system with compensation for the phase shift error inherent in a resolver position transducer described by this invention has the additional feature of being self-calibrating. The encoding system can be operated in a calibration mode in which the inherent phase shift error in the encoding circuitry $\gamma$ is measured. If the inherent phase shift error in the encoding circuitry $\gamma$ is taken into account, equations (4) and (5), respectively become:

$$T = K_3(\phi + \alpha + \gamma) \tag{4A}$$

$$T = K_4(\alpha + \gamma) \tag{5A}$$

The calculating means uses the measured value of the inherent phase shift error in the encoding circuitry $\gamma$ to compensate for the presence of this error during the normal measurement mode of operation and the compensation mode of operation.

The phase analog encoding system described by this inventio can be operated in a normal measurement mode, a compensation mode or a calibration mode of operation. During the compensation mode of operation, the inherent electrical phase shift of the resolver transducer is measured. This value is used during the normal measurement mode of operation to compensate the measurement of the mechanical displacement $\phi$. During the calibration mode of operation, the inherent phase shift error in the circuitry of the encoding means $\gamma$ is measured. This measured phase shift error is used to compensate the measurements made during the compensation mode and the normal measurement mode of operation so that they are independent of any phase shift error inherent in the encoding circuitry.

The inherent phase shift error in the circuitry of the encoding means $\gamma$ is measured in a time multiplexed fashion with the inherent electrical phase shift across the windings of the position transducer $\alpha$ and the sum $(\phi+\alpha)$ of the mechanical displacement of the position transducer $\phi$ and the inherent, electrical phase shift across the windings of the position transducer $\alpha$.

Periodically, at times selected by a calculating means and implemented by control electronics, the circuitry of the encoding means is operated in a calibration mode. During the calibration mode, the signal $K_1SIN\omega t$ is fed to the encoding circuitry instead of the feedback signal from the resolver transducer. This signal, $K_1SIN\omega t$ is the same as the reference signal that is being fed to the encoding circuitry. The measured time interval T between the zero crossings of these two signals is proportional to the inherent phase shift error in the encoding circuitry $\gamma$:

$$T=K_5(\gamma) \tag{6}$$

where $K_5$ is the proportionality constant.

In an ideal situation, the time period representing the phase shift between an input signal of $K_1SIN\omega t$ and a reference signal of $K_1SIN\omega t$ should be zero. However, in reality, this phase shift may not be zero because of an inherent error within the encoding circuitry due to such things as the electronic drift of component values over time and changes in temperature. If a value for the inherent phase shift error in the encoding circuitry $\gamma$ other than zero is measured, this value can be utilized by the calculating means to compensate the measurements made during the calibration and normal measurement modes of operation.

The duty cycle between the normal measurement cycle (measurement of $\phi+\alpha$), the compensation cycle (measurement of $\alpha$ only) and the calibration cycle (measurement of $\gamma$ only) is determined by the calculating means and can be either a strict function of time and/or a function of other variables deemed to be appropriate to the application of the resolver encoding system. The general theory for the measurement of the inherent phase shift error in the encoding circuitry $\gamma$ is the same as for the measurement of the inherent phase shift error across the resolver windings $\alpha$ except that only $K_1SIN\omega t$ is needed as a reference signal and can be used by the encoding means whereas in the measurement of $\alpha$, $K_1SIN\omega t$ or $-K_1SIN\omega t$ is applied to either the stator sine winding or the stator cosine winding and the rotor feedback signal is used by the enclding means.

BRIEF DESCRIPTION OF THE DRAWINGS

For a better understanding of the invention, reference may be had to the preferred embodiment exemplary of the invention shown in the accompanying drawings, in which.

DESCRIPTION OF THE PREFERRED EMBODIMENT

In the preferred embodiment, the invention is used in connection with a rotary resolver position transducer. The mechanical displacement $\phi$ in a rotary resolver position transducer is the mechanical rotor angle representing the angular displacement of the rotor with respect to the stator windings.

Figure 1:
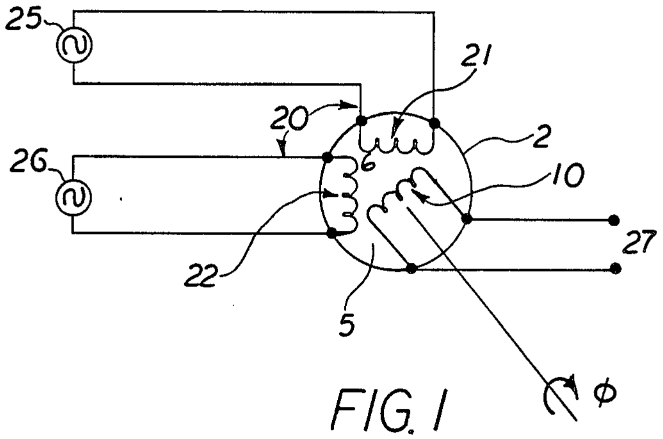
FIG. 1 shows a schematic of a rotary resolver position transducer with the reference signals applied to the stator windings and the feedback signal taken from the rotor winding in the phase analog form.

Referring to FIG. 1, a rotary resolver transducer 2 is basically an angle transducer and is well known in the art. Generally, a rotary resolver transducer includes a rotor 5 having one or more sets of spaced apart windings and a stator 6 having two or more sets of spaced apart windings. These windings are called a rotor winding 10, and stator windings 20, respectively.

Typically the resolver stator sine winding 21 is excited by a reference signal 25 of the form $K_1SIN\omega t$ and the resolver stator cosine winding 22 is excited by a reference signal 26 of the form $K_1COS\omega t$. When the stator windings 20 are excited by the above reference signals 25 and 26, the signal 27 on the feedback rotor winding 10 takes the form $K_2SIN(\omega t+\phi+\alpha)$ where the mechanical displacement $\phi$ is the mechanical rotor angle measuring the position of the rotor 5 with respect to the stator windings 20 and $\phi$ is the inherent electrical phase shift across the resolver transducer 2.

Figure 2:
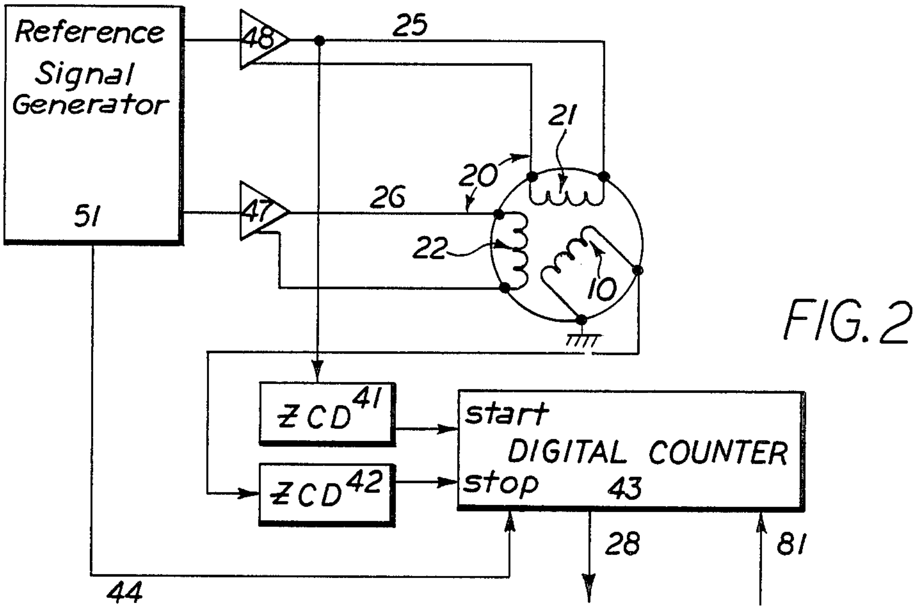
FIG. 2 shows a typical phase analog encoding system using a rotary resolver transducer wherein the relative phase shift between the reference sine winding and the feedback rotor winding is computed by a time interval circuit.

FIG. 2 shows a typical phase analog encoding system consisting of a resolver transducer 2, as shown in FIG. 1, a resolver encoding means and a resolver reference means, described hereinafter. A typical resolver encoding means consists of two zero crossing detectors 41 and 42 and a digital counter 43. The input to the first zero crossing detector 41 is from the sine reference signal 25, and the output is connected to the start switch of the digital counter 43. The input to the second zero crossing detector 42 is from the feedback rotor winding 10 and the output is connected to the stop switch of the digital counter 43.

The encoding system operates by starting the digital counter 43 when the first zero crossing detector 41 determines that the sine reference signal 25 crosses zero voltage. The digital counter 43 then counts the reference frequency 44 until a zero voltage crossing on the feedback rotor winding 10 is detected by the second zero crossing detector 42. The digital counter 43 is then stopped. The accumulated value 28 in the digital counter 43 is equal to the sum of the mechanical rotor angle and the inherent electrical phase shift of the resolver transducer ($\phi+\alpha$).

The resolution of the encoding system is determined by the reference frequency 44 which the digital counter 43 counts. The reference frequency 44 is generated by the resolver reference means which also generates the reference signals 25 and 26 which are applied to the resolver stator windings 20.

Figure 3:
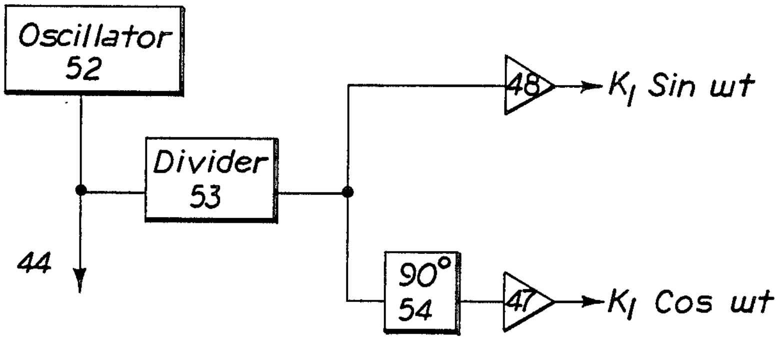
FIG. 3 shows a typical reference frequency generator where the value of the divider determines the resolution of the encoding system.

A typical resolver reference means, as shown in FIG. 2, consists of a reference signal generator 51 and two amplifiers 47 and 48 which are used to increase the strength of the reference signals 25 and 26 before they are applied to the resolver stator windings 20. The reference signal generator 51, as shown in FIG. 3, consists of an oscillator 52, a divider 53 and a 90° phase shifter 54.

The oscillator 52, generates the reference frequency 44 that is counted by the digital counter 43. To generate the reference signals 25 and 26 which are applied to the resolver stator windings 20, the output of the oscillator 52 is divided by a value N in a divider 53. The value of N can be pre-set or can be varied by the calculating means. Thus the reference frequency 44 is equal to N times the frequency of the reference signals 25 or 26 applied to the stator windings 20. The larger the value of N, the greater the resolution of the encoding system.

The output of divider 53 is fed through amplifier 48 before being applied to the stator sine winding 21. To obtain the reference signal 26 which is applied to the stator cosine winding 22, the output of divider 52 must be fed through a 90° phase shifter 54. This phase shifted reference signal is then amplified by amplifier 47 before being applied to the stator cosine winding 22.

Figure 4:
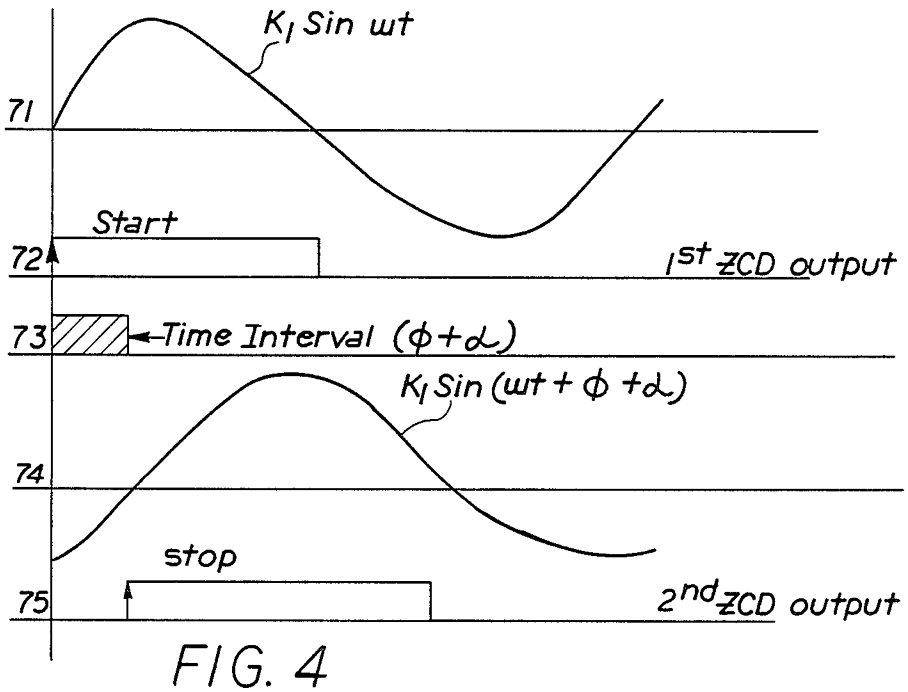
FIG. 4 shows the timing diagram for the encoding of the phase shift in the time interval.

The timing diagram for the phase analog encoding system of FIG. 2 is shown in FIG. 4. The reference signal 25 to the stator sine winding 21 is depicted by waveform 71. The voltage on the feedback rotor winding 10 is depicted by waveform 74. Waveforms 72 and 75 show the output of the first zero crossing detector 41 and the second zero crossing detector 42, respectively. Waveform 73 is the output 28 of the digital counter 43.

When the stator sine reference waveform 71 crosses zero, the first zero crossing detector 41 is activated as indicated by waveform 72 and this starts the digital counter 43 counting. The digital counter 43 continues to count the reference frequency 44 until it receives a signal to stop. When the feedback rotor winding waveform 74 crosses zero, the second zero crossing detector 42 is actived, as indicated by waveform 75 and this sends a stop counting signal to the digital counter 43. The time interval that the digital counter 43 has counted is equal to the sum of the mechanical rotor angle and the inherent electrical phase shift of the resolver transducer ($\phi+\alpha$). Typically the digital counter 43 is reset after the phase angle number is read in preparation for the next start/stop sequence.

Figure 5:
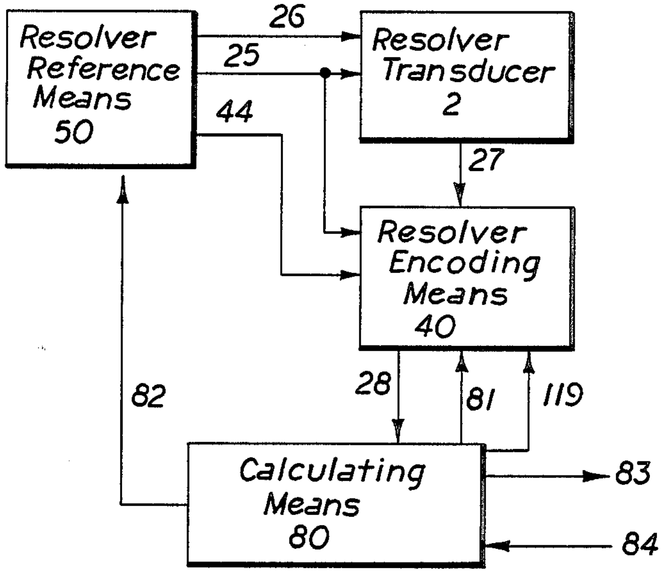
FIG. 5 shows a block diagram of the resolver based phase analog encoding system described by this invention.

The present invention discloses a novel and unique system for compensating for the inherent electrical phase shift error of a resolver position transducer in a time multiplexed fashion. Additionally, the invention has a self-calibrating feature. FIG. 5 shows the overall phase analog encoding system with compensation as described by the invention.

The resolver reference means 50 generates reference signals 25 and 26 which are fed to the resolver transducer 2 and reference signal 44 which is used by the digital counter 43 in the resolver encoding means 40. Under normal operation the rotor feedback signal 27 from the resolver transducer 2 is used by the resolver encoding means 40 along with the stator sine reference signal 25 and the reference signal 44 to measure the sum of the mechanical displacement $\phi$ and the inherent electrical phase shift across the resolver $\alpha$. The calculating means 80, uses the output 28 from the encoding means 40 along with any input control signals 84 to generate the reset signal 81 for the digital counter 43 and the system output signals 83 such as mechanical displacement, mechanical velocity, etc. The calculating means 80 also determines through control signal 82 which reference signals 25 and 26 of the resolver reference means 50 are applied to the resolver transducer 2.

Control signal 82 determines whether the entire encoding system is measuring the sum ($\phi+\alpha$) of the mechanical displacement $\phi$ and the electrical phase shift of the resolver $\alpha$ or just the electrical phase shift of the resolver $\alpha$. If control signal 82 has the encoding system in the normal measurement mode of operation the output 28 of the resolver encoding means 40 is the sum ($\phi+\alpha$) of the mechanical displacement $\phi$ and the inherent electrical phase shift of the resolver $\alpha$. If the control signal 82 has the encoding system in the compensation mode of operation the output 28 of the resolver encoding means 40 is the inherent electrical phase shift of the resolver, $\alpha$.

This measured value of $\alpha$ is then compared with an old value of $\alpha$ by the calculating means 80 and a new value of $\alpha$ is calculated. The new value of $\alpha$ is then used by the calculating means 80 along with the output 28 of the resolver encoding means 40 under the normal measurement mode of operation to obtain a value for the mechanical displacement $\phi$, which is independent of the inherent electrical phase shift of the resolver $\alpha$.

The calculating means 80, through control signal 119, also determines whether the entire encoding system is operating in the calibration mode or in the other modes of operation, i.e., the normal measurement mode or the compensation mode. As will be described in detail infra, control signal 119 takes priority over control signal 82.

Figure 6:
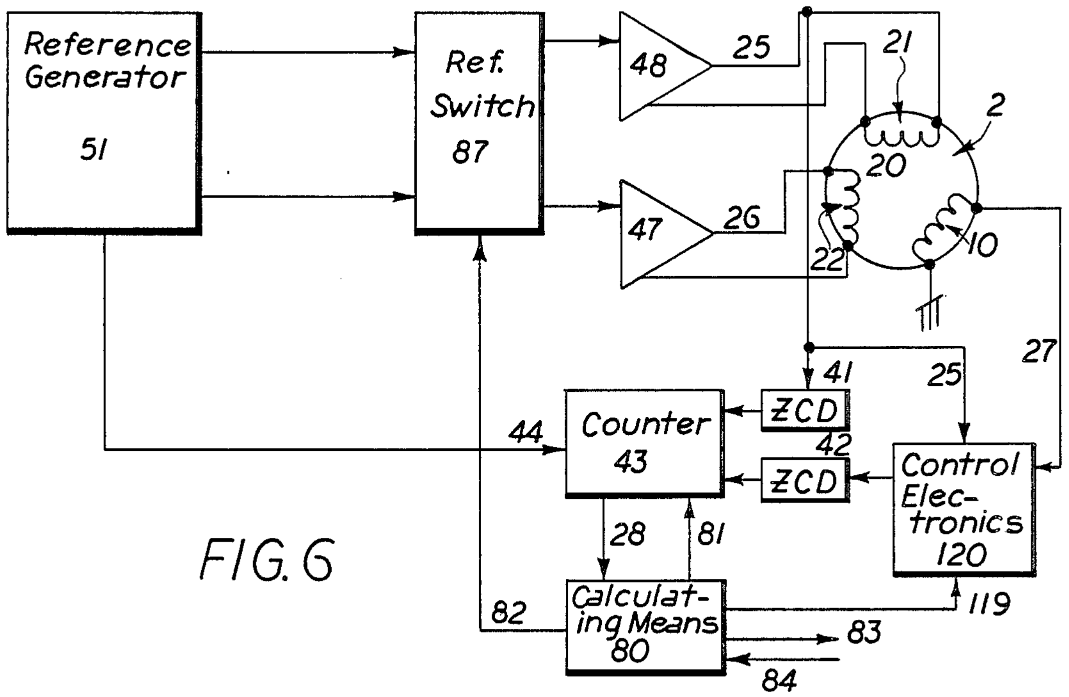
FIG. 6 shows the resolver based phase analog encoding system described by this invention as applied to a rotary resolver position transducer.

FIG. 6 shows the invention depicted by the block diagram in FIG. 5 as applied to a rotary resolver position transducer. The calculating means 80 in the preferred embodiment is a microprocessor unit. However, it does not have to be so limited. It can be any type of computer, arithimetic logic unit, or appropriate control circuitry and software which is capable of: processing the output 28 of the resolver encoding means 40; generating a control signal 82 for the resolver reference means which determines whether the encoding system is in the normal measurement mode of operation or in the compensation mode of operation; and generating a control signal 119 for the resolver encoding means which determines whether the encoding system is in the calibration mode of operation or in the other modes of operation, i.e., the normal measurement mode or the compensation mode.

The encoding system cannot be in all three modes of operation at once. It can only be in one mode of operation at a time. That is one of the advantages of this invention. It utilizes the same physical measuring circuit in a time sharing fashion to calculate the mechanical displacement $\phi$, the inherent electrical phase shift of the resolver transducer $\alpha$, and the inherent phase shift across the circuitry of the encoding means $\gamma$.

The duty cycle between the measurement cycle (measurement of $\phi+\alpha$) and the compensation cycle (measurement of $\alpha$ only) is determined by the software of the microprocessor unit and can be either a strict function of time and/or a function of other variables deemed to be appropriate, depending on the specific use of the encoding system. If the duty cycle is a strict function of time, the measurement cycle occurs on the order of 1000 times a second and the compensation cycle occurs on the order of once every second.

The duty cycle between the combination of the normal measurement cycle (measurement of $\phi+\alpha$), the compensation cycle (measurement of $\alpha$ only), and the calibration cycle (measurement of $\gamma$ only) is determined by the microprocessor and the control circuitry.

Figure 7:
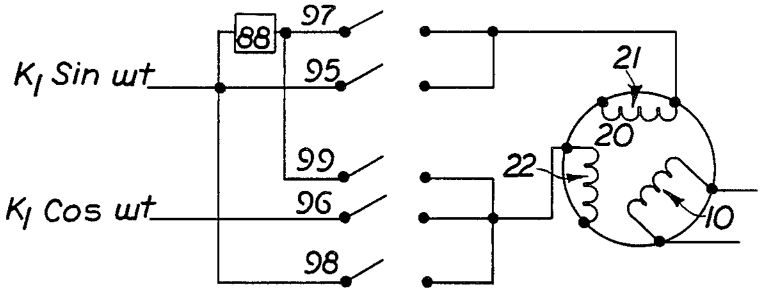
FIG. 7 shows the logic utilized in connection with a rotary resolver position transducer to determine which reference signal polarity and which stator winding should be excited during the compensation cycle in order to guarantee a rotor signal of sufficient magnitude to make a valid reading of the inherent electrical phase shift across the resolver windings regardless of the rotor position.

Reference switch 87, which implements control signal 82, is shown in FIG. 7. In the normal measurement mode of operation, switch 95 is closed connecting the sine reference signal 25 to the stator sine winding 21 and switch 96 is closed connecting the cosine reference signal 26 to the stator cosine winding 22.

In the compensation mode of operation the reference signal $K_1SIN\omega t$ or $-K_1SIN\omega t$ is applied to either the stator sine winding 21 or the stator cosine winding 22 depending upon the position of the resolver rotor 5 (i.e., the mechanical rotor angle of the resolver $\phi$). To obtain the reference signal $-K_1SIN\omega t$, the reference signal 25, $K_1SIN\omega t$, is put through a signal inverter 88.

If the mechanical rotor angle of the resolver $\phi$ is 0°, $\phi$45° or 315°, $\phi$360°, then only switch 98 is closed and the reference signal $K_1SIN\omega t$ is applied to the stator cosine winding 22.

If the mechanical rotor angle of the resolver $\phi$ is 45°, $\phi$135°, then only switch 95 is closed and the reference signal $K_1SIN\omega t$ is applied to the stator sine winding 21.

If the mechanical rotor angle of the resolver $\phi$ is 135°, $\phi$225°, then only switch 99 is closed and the reference signal $-K_1SIN\omega t$ is applied to the stator cosine winding 22.

If the mechanical rotor angle of the resolver $\phi$ is 225°, $\phi$315°, then only switch 97 is closed and the reference signal $-K_1SIN\omega t$ is applied to the stator sine winding.

The reason for applying the different reference signal (either $K_1SIN\omega t$ or $-K_1SIN\omega t$) to either the stator sine winding 21 or the stator cosine winding 22 is to ensure that there is a large signal output on the resolver rotor winding 10 and that the measurement of $\alpha$ will be valid independent of the rotor position $\phi$. The microprocessor unit determines what the value of $\phi$ is at any given point in time during the normal measurement cycle. This value of $\phi$ is then encoded into a binary number which determines which switch is closed and correspondingly which configuration of reference voltages is applied to the resolver stator windings. The table in FIG. 7 shows which binary number corresponds to which range of values of $\phi$ and what the reference switch position will be for that binary number.

Figure 8:
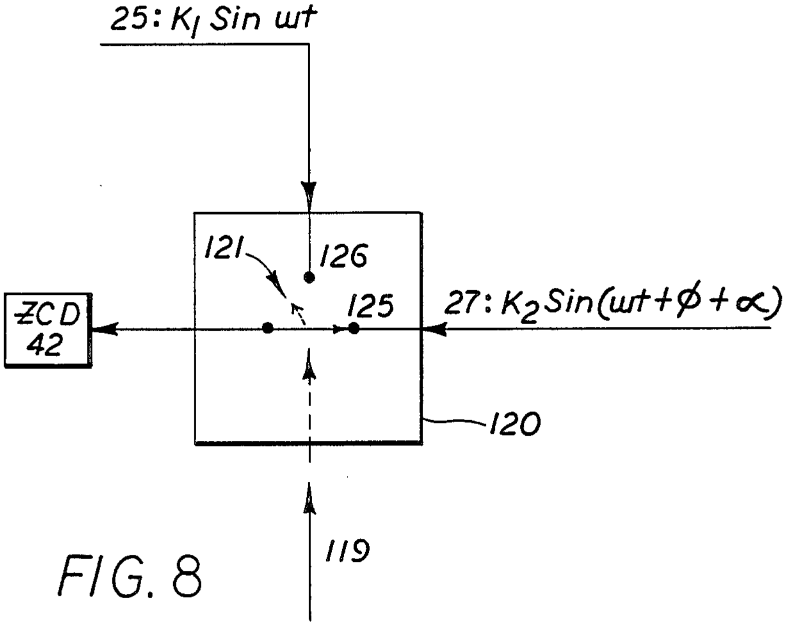
FIG. 8 shows an example of the control electronics which implements the control signal from the calculating means to determine when the resolver encoding means operates in the calibration mode.

FIG. 8 shows an example of the control electronics 120 necessary to implement control signal 119. In this case, the control electronics 120 is composed of an electronic switch 121. Control electronics 120 can be more elaborate, although it does not have to be. It can be as simple as a relay that moves electronic switch 121 from pole 125 to 126 when a control signal 119 is received.

In the normal, measurement mode of operation, or in the compensation mode of operation, electronic switch 121 is connected to pole 125 such that the feedback signal 27 is inputted into the second zero crossing detector 42 of the resolver encoding means 40. In the calibration mode of operation, the electronic switch 121 is connected to pole 126 such that the sine reference signal 25 is inputted into the second zero crossing detector 42 of the resolver encoding means 40.

In the calibration mode, the resolver encoding means measures the electrical phase shift between the signal at pole 126, $K_1SIN\omega t$, and the reference signal, $K_1SIN\omega t$, inputted into the first zero crossing detector 41. If the resolver encoding means is working perfectly, the output 28 of the resolver encoding means 40 will be zero since there is no phase shift between two signals of the form $K_1SIN\omega t$. If, however, the output 28 of the resolver encoding means 40 is a value other than zero, this value can be utilized by the calculating means 80 to compensate for this measured phase shift error when the encoding system is operating in the normal, measurement mode of operation or the compensation mode of operation.

Calculating means 80 sends a control signal 119 to the control electronics 120 to determine whether the entire encoding system is operating in the calibrating mode or in the other modes of operation, i.e., the normal measurement mode or the compensation mode. Control signal 119 takes priority over control signal 82 since electronic switch 121 must be connected to pole 125 before control signal 82 can have an effect on the resolver encoding means 40.

While a presently preferred embodiment of the invention has been shown and described, it may be otherwise embodies within the scope of the appended claims.

What is claimed is:

1. A resolver based phase analog encoding system for indicating position with compensation for an inherent electrical phase shift across said resolver comprising:

(a) a resolver transducer;

(b) a resolver reference means electrically connected to said resolver transducer for generating and applying a plurality of reference signals to said resolver transducer;

(c) a resolver encoding means electrically connected to said resolver transducer and said resolver reference means for measuring a sum ($\phi+\alpha$) of a mechanical displacement $\phi$ and an inherent electrical phase shift across said resolver transducer $\alpha$, or an inherent electrical phase shift across said resolver transducer $\alpha$ independent of the mechanical displacement $\phi$, or an inherent electrical phase shift due to said encoding means $\gamma$; and (d) a calculating means electrically connected to said resolver encoding means and said resolver reference means for compensating said measured sum ($\phi+\alpha$) by said measured inherent electrical phase shift $\alpha$ to obtain a value of said mechanical displacement $\phi$, said calculating means also compensating for said inherent electrical phase shift due to said encoding means $\gamma$, said calculating means controlling said resolver reference means and said resolver encoding means so that said sum $(\phi+\alpha)$, said inherent electrical phase shift across said resolver transducer $\alpha$, and said inherent electrical phase shift due to said encoding means $\gamma$ are measured in a time multiplexed manner; and wherein the calculating means, when the system is to measure the inherent electrical phase shift $\alpha$ sends a feedback signal to the resolver reference means to activate a reference switch in the resolver reference means thereby applying the correct reference signal in the correct orientation to the resolver transducer to compensate for the current value of the mechanical displacement $\phi$ thereby ensuring that the measurement of the inherent electrical phase shift $\alpha$ will be valid independent of the mechanical displacement $\phi$ of the resolver.

2. A resolver based phase analog encoding system as described in claim 1 wherein said resolver transducer comprises:

(a) a stator sine winding positioned on a stator;

(b) a stator cosine winding positioned on said stator; and (c) a rotor winding positioned on a rotor, said rotor being situated within said stator.

3. A resolver based phase analog encoding system as described in claim 1 wherein said resolver reference means comprises:

(a) a reference signal generator for generating a plurality of reference signals;

(b) a reference signal switch electrically connecting the output of said reference signal generator to said resolver transducer; and (c) an amplifying means electrically located between said reference signal generator and said resolver transducer for increasing the magnitude of said reference signals before applying them to said resolver transducer.

4. A resolver based phase analog encoding system as described in claim 1 wherein said resolver transducer comprises: a stator sine winding positioned on a stator; a stator cosine winding, positioned on said stator; and a rotor winding positioned on a rotor, said rotor being siturated within said stator; and wherein said resolver reference means comprises: a reference signal generator for generating reference signals; a reference signal switch electrically connecting the output of said reference signal generator to said stator sine and cosine windings such that the position of said reference switch helps determine whether said resolver encoding means measures $(\phi+\alpha)$, $\alpha$ or $\gamma$; and an amplifying means electrically located between said reference signal generator and said resolver transducer for increasing the magnitude of said reference signals that are applied to said stator sine and cosine windings.

5. A resolver based phase analog encoding system as described in claim 1 wherein said resolver encoding means comprises:

(a) a digital counting means, the output of said counting means being proportional to $(\phi+\alpha)$, $\alpha$ or $\gamma$;

(b) a zero crossing detector electrically connected to said digital counting means for starting said digital counting means, said zero crossing detector measuring when a reference signal is zero;

(c) a second zero crossing detector electrically connected to said digital counting means for stopping said digital counting means, said second zero crossing detector measuring when either the output of said resolver transducer or a reference signal is zero; and (d) control electronics for electrically connecting either the output of said resolver transducer or said reference signal to said second zero crossing detector.

6. A resolver based phase analog encoding system as described in claim 1 wherein said calculating means is a computer.

7. A resolver based phase analog encoding system as described in claim 1 wherein said calculating means is a microprocessor.

8. A resolver based phase analog encoding system as described in claim 1 wherein said calculating means is a microprocessor, said microprocessor controlling said resolver reference means and said resolver encoding means to operate said encoding system in either a normal measurement mode, a compensation mode, or a calibration mode, with $\alpha$ measured during said compensation mode, used to compensate said sum $(\phi+\alpha)$ measured during said normal measurement mode and with $\gamma$ measured during said calibration mode used to compensate both said sum $(\phi+\alpha)$ and $\alpha$.

9. A resolver based phase analog encoding system as described in claim 1 wherein said calculating means is a computer, said computer controlling said resolver reference means and said resolver encoding means to operate said encoding system in either a normal measurement mode, a compensation mode, or a calibration mode with $\alpha$ measured during said compensation mode used to compensate said sum $(\phi+\alpha)$ measured during said normal measurement mode and with $\gamma$ measured during said calibration mode used to compensate both said sum $(\phi+\alpha)$ and $\alpha$.

10. A resolver based phase analog encoding system for indicating position with compensation for an inherent electrical phase shift across said resolver comprising:

(a) a resolver transducer;

(b) a resolver reference means electrically connected to said resolver transducer for generating and applying a plurality of reference signals to said resolver transducer, wherein said resolver reference means comprises: a reference signal generator for generating reference signals; a reference signal switch electrically connecting the output of said reference signal generator to said resolver transducer such that the position of said reference switch determines whether a resolver encoding means measures a sum $(\phi+\alpha)$ of a mechanical displacement $\phi$ and an inherent electrical phase shift across said resolver transducer $\alpha 0$ or an inherent electrical phase shift across said resolver transducer $\alpha$; and an amplifying means electrically located between said reference signal generator and said resolver transducer for increasing the magnitude of said reference signals that are applied to said resolver transducer;

(c) a resolver encoding means electrically connected to said resolver transducer and said resolver reference means for measuring said sum $(\phi+\alpha)$ of said mechanical displacement $\phi$ and said inherent electrical phase shift across said resolver transducer $\alpha$, or said inherent electrical phase shift across said resolver transducer $\alpha$ independent of the mechanical displacement $\phi$, or said inherent electrical phase shift due to said encoding means $\gamma$; wherein said resolver encoding means comprises: a digital counting means, the output of said counting means being proportional to $(\phi+\alpha)$, $\alpha$ or $\gamma$; a zero crossing detector electrically connected to said digital counting means for starting said digital counting means, said zero crossing detector measuring when a reference signal is zero; a second zero crossing detector electrically connected to said digital counting means for stopping said digital counting means, said second zero crossing detector measuring when either the output of said resolver transducer or a reference signal is zero; and control electronics for electrically connecting either the output of said resolver transducer or said reference signal to said second zero crossing detector; and (d) a calculating means electrically connected to said resolver encoding means and said resolver reference means for compensating said measured sum $(\phi+\alpha)$ by said measured inherent electrical phase shift $\alpha$ to obtain a value of said mechanical displacement $\phi$, said calculating means also compensating for said inherent electrical phase shift due to said encoding means $\gamma$, said calculating means controlling said resolver reference means and said resolver encoding means so that said sum $(\phi+\alpha)$, said inherent electrical phase shift across said resolver transducer $\alpha$ and said inherent electrical phase shift due to said encoding means $\gamma$, are measured in a time multiplexed manner; and wherein the calculating means, when the system is to measure the inherent electrical phase shift $\alpha$ sends a feedback signal to the resolver reference means to activate the reference signal switch in the resolver reference means thereby applying the correct reference signal from the reference signal generator in the correct orientation to the resolver transducer to compensate for the current value of the mechanical displacement $\phi$ thereby ensuring that the measurement of the inherent electrical phase shift $\alpha$ will be valid independent of the mechanical displacement $\phi$ of the resolver.

11. A resolver based phase analog encoding system as described in claim 10 wherein said calculating means is a computer.

12. A resolver based phase analog encoding system as described in claim 10 wherein said calculating means is a microprocessor.

13. A resolver based phase analog encoding system as described in claim 8 wherein said calculating means is a microprocessor, said microprocessor controlling said reference switch and said control electronics to operate said encoding system in either a normal measurement mode, a compensation mode, or a calibration mode with $\alpha$ measured during said compensation mode used to compensate said sum $(\phi+\alpha)$ measured during said normal measurement mode and with $\gamma$ measured during said calibration mode used to compensate both said sum $(\phi+\alpha)$ and $\alpha$.

14. A resolver based phase analog encoding system as described in claim 10 wherein said calculating means is a computer, said computer controlling said reference switch and said control electronics to operate said encoding system in either a normal measurement mode, a compensation mode, or a calibration mode, with $\alpha$ measured during said compensation mode used to compensate said sum $(\phi+\alpha)$ measured during said normal measurement mode and with $\gamma$ measured during said calibration mode used to compensate both said sum $(\phi+\alpha)$ and $\alpha$.

15. A resolver based phase analog encoding system for indicating the position of a rotatable shaft with compensation for an inherent electrical phase shift across said resolver comprising:

(a) a resolver transducer;

(b) a resolver reference means electrically connected to said resolver transducer for generating and applying a plurality of reference signals to said resolver transducer, wherein said resolver reference means comprises: a reference signal generator for generating reference signals; a reference signal switch electrically connecting the output of said reference signal generator to said resolver transducer such that the position of said reference switch helps determine whether a resolver encoding means measures a sum $(\phi+\alpha)$ of a mechanical rotor angle $\phi$ and an inherent electrical phase shift across said resolver transducer $\alpha$ or an inherent electrical phase shift across said resolver transducer $\alpha$; and an amplifying means electrically located between said reference signal generator and said resolver transducer for increasing the magnitude of said reference signals that are applied to said resolver transducer;

(c) a resolver encoding means electrically connected to said resolver transducer and said resolver reference means for measuring said sum $(\phi+\alpha)$ of said mechanical rotor angle $\phi$ and said inherent electrical phase shift across said resolver transducer $\alpha$, or said inherent electrical phase shift across said resolver transducer $\alpha$ independent of the mechanical rotor angle $\phi$, or said inherent electrical phase shift due to said encoding means $\gamma$; wherein said resolver encoding means comprises: a digital counting means, the output of said counting means being proportional to $(\phi+\alpha)$, $\alpha$ or $\gamma$; a zero crossing detector electrically connected to said digital counting means for starting said digital counting means, said zero crossing detector measuring when a reference signal is zero; a second zero crossing detector electrically connected to said digital counting means for stopping said digital counting means, said second zero crossing detector measuring when either the output of said resolver transducer or a reference signal is zero; and control electronics for electrically connecting either the output of said resolver transducer or said reference signal to said second zero crossing detector; and (d) a calculating means electrically connected to said resolver encoding means and said resolver reference means for compensating said measured sum $(\phi+\alpha)$ by said measured inherent electrical phase shift $\alpha$ to obtain a value of said mechanical rotor angle $\phi$, said calculating means also compensating for said inherent electrical phase shift due to said encoding means $\gamma$, said calculating means controlling said resolver reference means and said resolver encoding means so that said sum $(\phi+\alpha)$, said inherent electrical phase shift across said resolver transducer $\alpha$ and said inherent electrical phase shift due to said encoding means $\gamma$, are measured in a time multiplexed manner; and wherein the calculating means, when the system is to measure the inherent electrical phase shift $\alpha$ sends a feedback signal to the resolver reference means to activate the reference signal switch in the resolver reference means thereby applying the correct reference signal from the reference signal generator in the correct orientation to the resolver transducer to compensate for the current value of the mechanical displacement $\phi$ thereby ensuring that the measurement of the inherent electrical phase shift $\alpha$ will be valid independent of the rotor angle $\phi$ of the resolver.

16. A resolver based phase analog encoding system as described in claim 15 wherein said calculating means is a computer.

17. A resolver based phase analog encoding system as described in claim 15 wherein said calculating means is a microprocessor.

18. A resolver based phase analog encoding system as described in claim 15 wherein said calculating means is a microprocessor, said microprocessor controlling said reference switch and said control electronics to operate said encoding system in either a normal measurement mode, a compensation mode, or a calibration mode with $\alpha$ measured during said compensation mode used to compensate said sum $(\phi+\alpha)$ measured during said normal measurement mode and with $\gamma$ measured during said calibration mode used to compensate both said sum $(\phi+\alpha)$ and $\alpha$.

19. A resolver based phase analog encoding system as described in claim 15 wherein said calculating means is a computer, said computer controlling said reference switch and said control electronics to operate said encoding system in either a normal measurement mode, a compensation mode, or a calibration mode with $\alpha$ measured during said compensation mode, used to compensate said sum $(\phi+\alpha)$ measured during said normal measurement mode and with $\gamma$ measured during said calibration mode used to compensate both said sum $(\phi+\alpha)$ and $\alpha$.

* * * * *

UNITED STATES PATENT AND TRADEMARK OFFICE
CERTIFICATE OF CORRECTION

PATENT NO. : 4,712,106
DATED : December 8, 1987
INVENTOR(S) : McNally

It is certified that error appears in the above—identified patent and that said Letters Patent is hereby corrected as shown below:

In the Abstract, line 4: please delete --a-- and insert "the" therefor.

Column 2, line 19: please delete --Ø-- and substitute "α" therefor.

Column 2, line 25: please delete --degress-- and substitute "degrees" therefor.

Column 3, line 27: please delete --since-- and substitute "sine" therefor.

Column 3, line 64: please delete --windings-- and substitute "winding" therefor.

Column 4, lines 3 and 4: please delete --0°,Ø45° or 315°,Ø360°-- and substitute "0°∠ Ø ≦ 45° or 315° ∠ Ø ≦ 360°" therefor.

Column 4, line 6: please delete --45°,Ø135°-- and substitute "45° ∠ Ø ≦ 135°" therefor.

Column 4, line 8: please delete --135°,Ø225°-- and substitute "135° ∠ Ø ≦ 225°" therefor.

Column 4, line 11: please delete --225°,Ø315°-- and substitute "225° ∠ Ø ≦ 315°" therefor.

Column 5, line 2: please delete --inventio-- and substitute "invention" therefor.

UNITED STATES PATENT AND TRADEMARK OFFICE

CERTIFICATE OF CORRECTION

PATENT NO. : 4,712,106

DATED : December 8, 1987

INVENTOR(S) : McNally

It is certified that error appears in the above—identified patent and that said Letters Patent is hereby corrected as shown below:

Column 8, line 61: please delete --arithimetic-- and substitute "arithmetic" therefor.

Column 9, line 42: please delete --315°,Ø360°-- and substitute "315° < Ø ≤ 360°" therefor.

Column 9, lines 45 and 46: please delete --45°,Ø135°-- and substitute "45° < Ø ≤ 135°" therefor.

Column 9, lines 48 and 49: please delete --135°,Ø225°-- and substitute "135° < Ø ≤ 225°" therefor.

Column 9, lines 52 and 53: please delete --225°,Ø315°-- and substitute "225° < Ø ≤ 315°" therefor.

Column 10, line 45: please delete --embodies-- and substitute "embodied" therefor.

Column 11, line 47: please delete --siturated-- and substitute "situated" therefor.

Column 12, line 56: please delete -- 0-- and substitute "_" therefor.

UNITED STATES PATENT AND TRADEMARK OFFICE
CERTIFICATE OF CORRECTION

PATENT NO. : 4,712,106

DATED : December 8, 1987

INVENTOR(S) : McNally

It is certified that error appears in the above-identified patent and that said Letters Patent is hereby corrected as shown below:

Column 13, line 52: please delete --8-- and substitute "10" therefor.

Signed and Sealed this

Eleventh Day of June, 1991

*Attest:*

HARRY F. MANBECK, JR.

*Attesting Officer*

*Commissioner of Patents and Trademarks*